M. B. DODGE.
Ore Crusher.

No. 50,563.            Patented Oct. 24, 1865.

Witnesses:            Inventor:

UNITED STATES PATENT OFFICE.

M. B. DODGE, OF NEW YORK, N. Y.

IMPROVEMENT IN QUARTZ-CRUSHERS.

Specification forming part of Letters Patent No. 50,563, dated October 24, 1865.

*To all whom it may concern:*

Be it known that I, M. B. DODGE, of the city, county, and State of New York, have invented a new and Improved Quartz-Crusher; and I do hereby declare that the following is a full, clear, and exact description thereof, which will enable those skilled in the art to make and use the same, reference being had to the accompanying drawings, forming part of this specification, in which—

Figure 1:
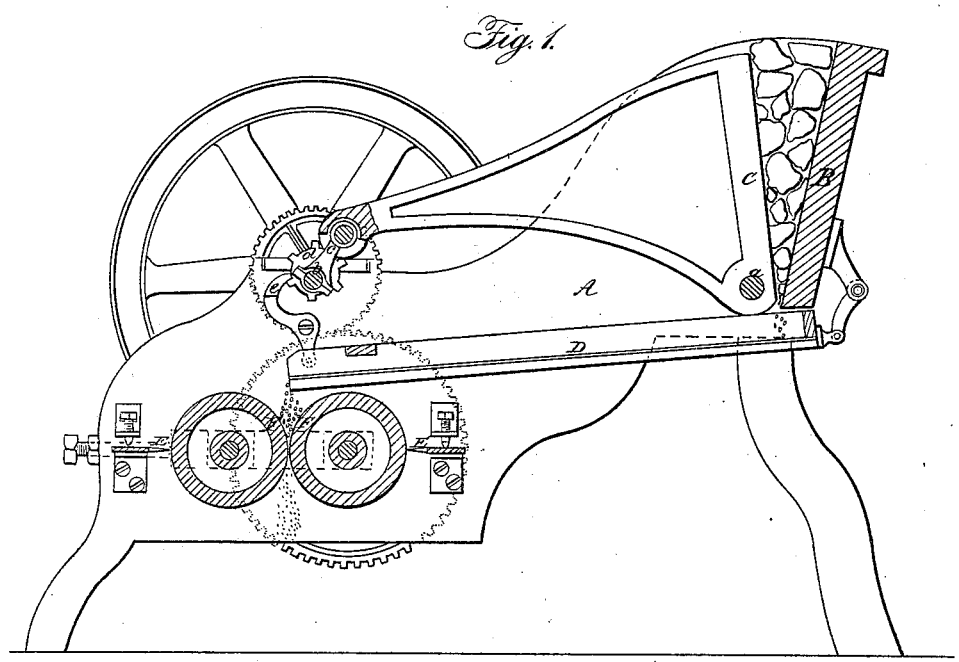
Figure 2:
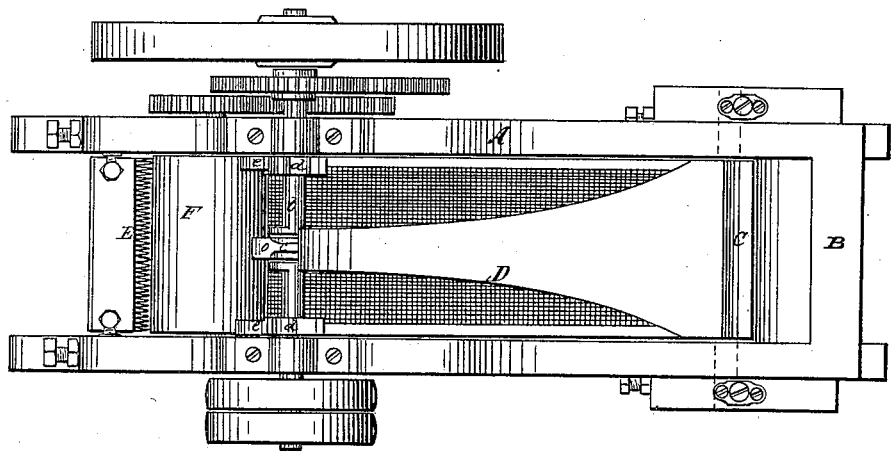

Figure 1 represents a longitudinal vertical section of this invention. Fig. 2 is a plan or top view of the same.

Similar letters of reference indicate corresponding parts.

This invention relates to certain improvements in that class of quartz-crushers in which the crushing is effected between a stationary and an oscillating jaw in connection with suitable crushing-rollers.

The invention consists in the arrangement of a sieve between the crushing jaws and rollers in such a manner that the pieces of rock, on being discharged from between the crushing-jaws and while passing over the sieve, are divested from all fine dust adhering to them, and the full benefit of the rollers is obtained, which is not the case if the pieces of rock, together with the dust, on leaving the jaws, drop directly between the rollers, because in this case the interstices between said pieces are occupied by the dust and the pieces are prevented from spreading.

In order to keep the surface of the rollers clean and prevent the dust adhering to their surface, comb-shaped scrapers or brushes are applied, which are adjustable, so that their points can always be kept in contact with the periphery of the rollers.

A represents a frame, of cast-iron or other suitable material, of convenient shape to form the bearings for the working parts of my crusher. One end of this frame forms the stationary crushing-jaw B, and opposite to this stationary jaw is the oscillating jaw C, which swings on a rock-shaft or gudgeons, $a$, and to which the desired oscillating motion is imparted from the main shaft $v$, that is provided with a crank which connects by a link, $c$, with the tail of said crushing-jaw, as clearly shown in the drawings. The quartz, on being discharged from between the crushing-jaws, drops upon a sieve, D, which is supported in such a manner that a longitudinally-shaking motion can be imparted to it by the action of cam-wheels $d$ on suitable tappets, $e$, said cam-wheels being mounted on the driving-shaft $b$, and by the sieve the pieces of quartz are carried to the crushing-rollers F, by which they are reduced to the desired fineness. While passing over the sieve the pieces of rock, which, on dropping from between the crushing-jaws, are enveloped in a fine dust, are divested therefrom, the dust being made to pass through the meshes of the sieve, and the rollers are enabled to act upon said pieces with their full force, which they cannot do if the pieces are passed from the crushing-jaws directly to the rollers, because if the space between said jaws are filled up with dust the pieces are not permitted to spread, and thereby the crushing is rendered difficult or impossible.

By combining the sieve with the jaws and rollers the whole machine can be operated with less power than before, and, furthermore, a better result is obtained, since the ore is reduced to an even and uniform fineness.

The crushing-surface of the rollers is kept clean by comb-shaped scrapers E, which are secured to brackets $e$ in the lower part of the frame A, and which are so arranged that their points can be set up against the peripheries of the rollers. By the application of these combs all dust adhering to the rollers is removed, and said rollers are enabled to work with their full force on the pieces of rock passing through between them.

Instead of the scrapers shown in the drawings, simple brushes made of brush-wood or wire might be used.

What I claim, and desire to secure by Letters Patent, is—

The arrangement of the sieve D between the crushing-jaws B C and crushing-rollers F, and in combination therewith, substantially as and for the purpose set forth.

M. B. DODGE.

Witnesses:
 M. M. LIVINGSTON,
 C. L. TOPLIFF.